J. Butler,
Coupling for Connecting Inlet Pipe of Gas Mach.
No. 101,224.    Patented Mar. 29, 1870.
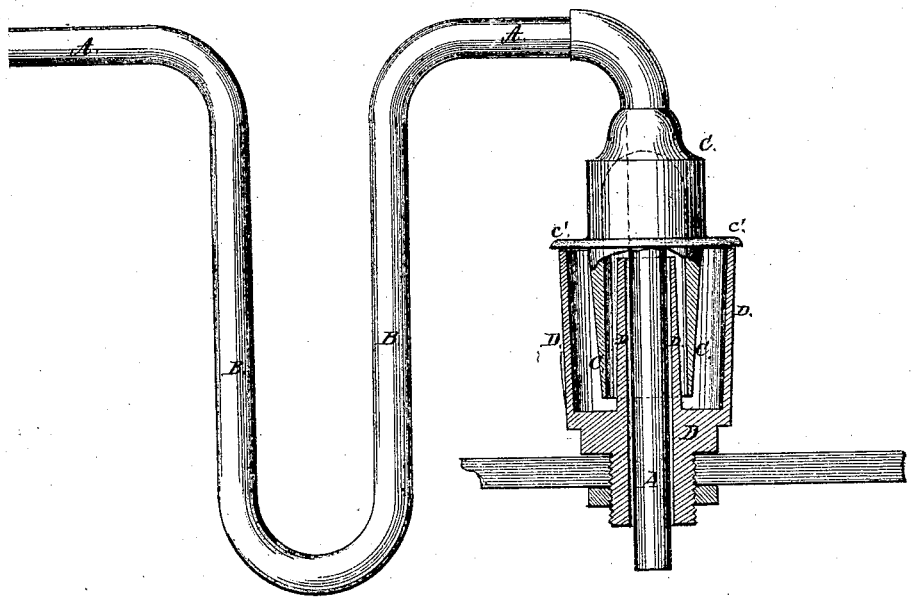
Witnesses:
A. W. Almquist
D. Misell
Inventor:
J. Butler
per Munn & Co
Attorneys

United States Patent Office.

JOHN BUTLER, OF NEW YORK, N. Y.

IMPROVEMENT IN COUPLINGS FOR CONNECTING THE INLET-PIPE TO THE RETORT OF A GAS-MACHINE.

Specification forming part of Letters Patent No. 101,224, dated March 29, 1870.

*To all whom it may concern:*

Be it known that I, JOHN BUTLER, of the city, county, and State of New York, have invented a new and useful Improvement in Couplings for Connecting the Inlet-Pipe to the Retort-Cover of a Gas-Machine; and I do hereby declare that the following is a full, clear, and exact description thereof, which will enable others skilled in the art to make and use the same, reference being had to the accompanying drawing, forming part of this specification, in which the figure is a side view of my improved coupling, partly in section, to show the construction.

My invention has for its object to furnish an improved coupling for connecting the inlet-pipe to the retort-cover of a gas-machine, which shall be so constructed as to allow the pipe and cover to be readily disconnected, when desired, for convenience in detaching the said retort-cover; and it consists in the coupling constructed as hereinafter more fully described.

A represents the inlet-pipe, upon which is formed a siphon, B, designed to be immersed in a cold-water or condensing vessel.

C is the upper part of the coupling, through which the end part of the pipe A passes, and which is securely attached to said pipe. The part C is made in the shape of an inverted cup, and around its upper or base part is formed a flange, C', which rests upon the upper edge of the outer wall of the lower part, D, of the coupling. The base of the part D is securely attached to the cover of the retort in such a way as to be gas-tight. The part D is made in the shape of a double cup, through the central cavity of which the end of the pipe A passes, and into the ring-shaped space between the inner and outer walls of which the cup of the upper part, C, projects, as shown in the figure.

The ring-shaped space between the inner and outer walls of the lower part, D, of the coupling is filled with a metal melting at a low temperature, so that the heat of the retort will keep it in a liquid form, or with an oil—such as palm-oil or linseed-oil or some other liquid vaporizing at a high temperature, the substance being immaterial, provided it be of such a nature that it will remain liquid and will not be evaporated by the heat of the retort.

This construction of the coupling allows the pipe to be readily disconnected from the retort-cover when required, and at the same time entirely prevents the escape of gas through the said coupling.

Having thus described my invention, I claim as new and desire to secure by Letters Patent—

The coupling C D for connecting the inlet-pipe with the retort-cover of a gas-machine, constructed and operating substantially as herein shown and described, and for the purpose set forth.

The above specification of my invention signed by me this 25th day of January, 1870.

JOHN BUTLER.

Witnesses:
GEO. W. MABEE,
JAMES T. GRAHAM.